March 16, 1926.
C. W. VAN RANST
1,576,880
BRAKE CONSTRUCTION
Filed April 15, 1922
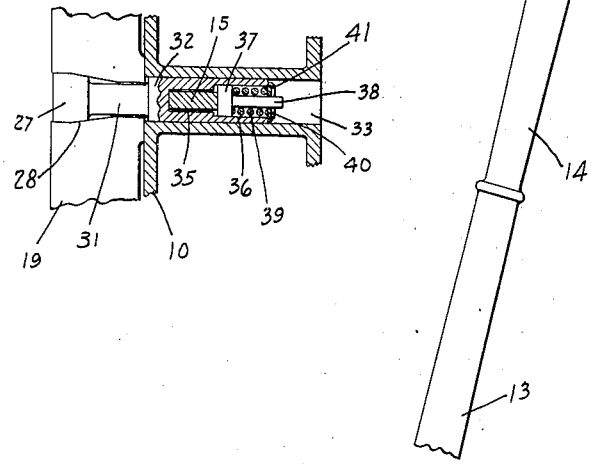
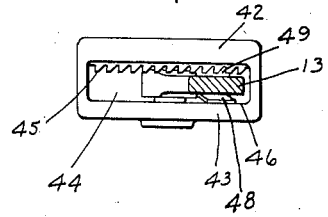
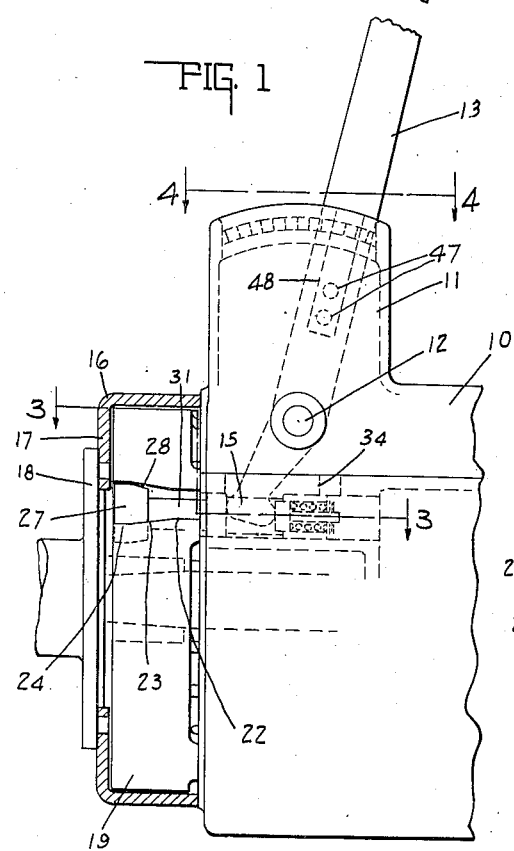
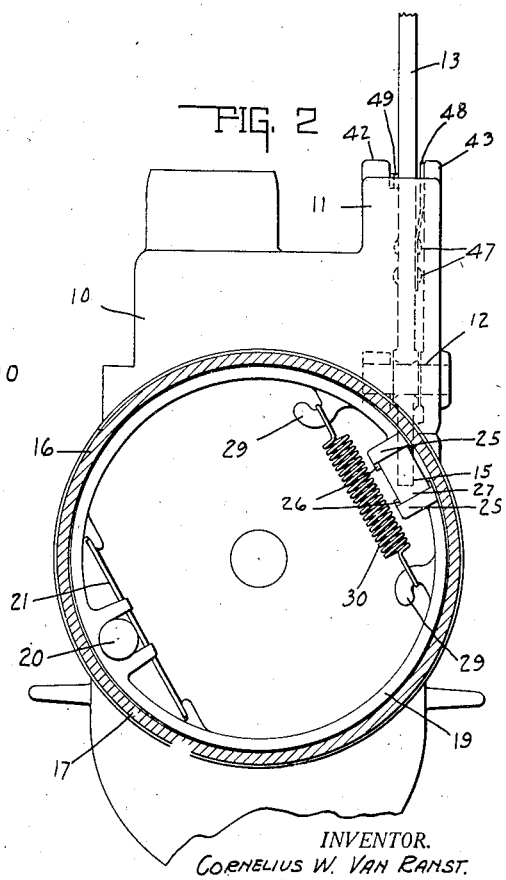
INVENTOR.
CORNELIUS W. VAN RANST.
BY
ATTORNEYS.

Patented Mar. 16, 1926.

1,576,880

UNITED STATES PATENT OFFICE.

CORNELIUS W. VAN RANST, OF INDIANAPOLIS, INDIANA.

BRAKE CONSTRUCTION.

Application filed April 15, 1922. Serial No. 553,285.

*To all whom it may concern:*

Be it known that I, CORNELIUS W. VAN RANST, a citizen of the United States, and a resident of Indianapolis, county of Marion, and State of Indiana, have invented a certain new and useful Brake Construction; and I do hereby declare that the following is a full, clear, and exact description thereof, reference being had to the accompanying drawings, in which like numerals refer to like parts.

This invention relates to improvements in a brake mechanism and the brake is adapted to be associated with a member driven by the engine of a self-propelled vehicle and enclosed by the transmission housing.

The chief object of the invention is to simplify the present brake constructions, and in accomplishing said object the customary release mechanism associated with the actuating brake lever has been dispensed with.

One feature of the invention consists in the wedge construction for expanding the brake shoe into engagement with an enclosing brake drum.

Another feature of the invention consists in the provision of a shock absorber construction, and which in addition to the aforesaid function is adapted to cooperate with another spring associated with the brake lever to maintain said brake lever in the desired position and prevent rattling thereof in said position.

The full nature of the invention will be understood from the accompanying drawings and the following description and claim.

In the drawings, Fig. 1 is a side elevational view of the brake mechanism. Fig. 2 is an end view of the same, parts being removed to show other parts in detail. Fig. 3 is a sectional view of the wedge and shock absorber constructions, taken on the line 3—3 of Fig. 1 and in the direction of the arrows. Fig. 4 is a sectional view taken on the line 4—4 of Fig. 1 and in the direction of the arrows and illustrates the means for maintaining the lever in the desired position.

In the drawings 10 indicates a suitable housing such as that of the transmission and having a hollow extension 11. The housing 10 provides a pivot 12 upon which is mounted a brake lever 13 having the usual handle portion 14 and the actuating portion 15 opposite said handle portion. A rotatably mounted brake drum 16 is suitably supported adjacent the housing 10 and is provided with an inwardly extending flange portion 17 to which is secured the member 18. The member 18 may be associated with the propeller shaft, but it is to be understood that the member 18 is driven by the engine when installed in a self-propelled vehicle.

Within the brake drum is a brake shoe 19 which is stationarily supported at 20. Associated with said support is a spring member 21. The brake shoe 19 is split at 22, and said split ends are provided with an inclined portion 23 and an enlarged portion 24. Suitably associated with the ends of the brake shoe are the guides 25 having the retaining portion 26. Slidably supported in the before-mentioned split is a wedge member 27 having the inclined portion 28 adapted to engage the inclined walls 23 of the ends of the brake shoe. Adjacent the ends of the brake shoe and within the latter are a plurality of hooks 29. Said hooks are connected by a spring 30 which tends to maintain the ends of the brake shoe in the released and retracted position.

The wedge is provided with a stem portion 31 which is enlarged at 32 and is slidably supported in a housing 33 having the slot 34 therein, see Fig. 1. The slidably supported portion 32 is apertured at 35, and said aperture is enlarged at 36. The aperture 35 receives the free end 15 of the brake lever. Adjacent the brake lever and within the enlarged portion 36 is a plunger 37 having a stem 38. In the space between the stem 38 and the enlarged opening 36 is positioned a coiled spring 39, one end bearing against the plunger body 37 and the other end bearing against a spring retainer or washer 40, which slidably supports the stem 38. The washer 40 is maintained in position to close the opening 36, by the ends of the wall 36 being turned or rolled over, as at 41. The construction hereinbefore described, which is clearly shown in Fig. 3, may be termed a shock absorber construction. Since the movement of the brake lever, first is directed to compress the spring 39 and thereafter to move the plunger 32 which carries with it the wedge 27 into engagement with the inclined walls 23 of the adjacent ends of the brake shoe to expand said brake shoe into engagement with the interior of the brake drum to frictionally retard the same.

The housing 11, as heretofore explained, is hollow. Said housing terminates in arcuate or curved portions 42 and 43. The arcuate portions 42 and 43, as shown clearly in Fig. 4, are spaced from each other, and in the slot or opening 44 is positioned the brake lever 13. The arcuate portion 42 is provided upon its inner face with ratchet teeth 45; while the arcuate portion 43 upon its inner face is finished smooth at 46. Within the housing 11 and suitably secured upon the brake lever 13, as by the rivets 47, is a spring 48, which has its free end positioned in the slot 44 and normally bears against the finished face 46 of the arcuate portion 43. The brake lever also is provided with complementary ratchet teeth 49 adapted to mesh with the teeth 45. The teeth 45 normally prevent movement of the brake lever in the forward or brake releasing position. The spring 48 normally tends to maintain the teeth on said brake lever in engagement with the teeth of the ratchet; while the shock absorber construction, through the spring 39 thereof, exerts pressure upon the free end 15 of the brake lever to force the teeth of the brake lever forwardly into engagement with the teeth and towards the brake releasing position, thereby securely locking said brake lever in the desired position and maintaining the same in said position without the rattling thereof.

From the foregoing it will be understood that the customary release mechanism associated with the brake lever for releasing said brake lever from engagement with its ratchet, has been eliminated and the only movement required for applying the brake is to grasp the handle and pull the same into the desired position. The yielding means including the spring 48 and the spring 39 are compressed in said movement to permit the teeth on the lever to ratchet on the teeth 45. To release the brake lever, the handle is grasped and pressure is exerted to compress the spring 48 until the teeth on the lever clear the teeth on the ratchet, whereupon the lever may be moved into the desired position and released to the action of the spring construction 48 heretofore described.

While the invention has been described in great detail in the aforesaid specification, the foregoing is illustrative and not restrictive in character, and it is to be understood further that many modifications of the foregoing will readily suggest themselves to those skilled in the art to which this invention applies, but said modifications are to be considered within the broad purview of this invention, as outlined by the appended claim.

The invention claimed is:

In a brake construction, the combination with an expansible brake shoe, a wedge construction for expanding said shoe, a lever for moving said wedge into expanding and releasing position, and a pair of springs rectangularly arranged with respect to said lever for preventing rattling thereof.

In witness whereof, I have hereunto affixed my signature.

CORNELIUS W. VAN RANST.